United States Patent [19]
Whitley et al.

[11] Patent Number: 5,224,116
[45] Date of Patent: Jun. 29, 1993

[54] LASER AMPLIFIER

[75] Inventors: Timothy J. Whitley, Suffolk; Jonathan R. Armitage, Ipswich; Colin A. Millar, Suffolk, all of England

[73] Assignee: BT&D Technologies Ltd., Ipswich, England

[21] Appl. No.: 959,473

[22] Filed: Oct. 9, 1992

Related U.S. Application Data

[63] Continuation of Ser. No. 768,222, Oct. 15, 1991, filed as PCT/GB90/00354, Mar. 8, 1990, abandoned.

[30] Foreign Application Priority Data

Mar. 8, 1989 [GB] United Kingdom ............... 8905276

[51] Int. Cl.$^5$ ............... H01S 3/091; H01S 3/092
[52] U.S. Cl. ............................ 372/71; 372/6
[58] Field of Search ....................... 372/6, 68, 71

[56] References Cited

U.S. PATENT DOCUMENTS 3,582,820  6/1971  Snitzer ............... 372/71
4,852,117  7/1989  Po ....................... 372/6

FOREIGN PATENT DOCUMENTS 0112090  6/1984  European Pat. Off. .

OTHER PUBLICATIONS

Optical Fiber Communication Conference and Sixth International Conference on Integrated Optics and Optical Fiber Communication Technical Digest—Jan. 19–22 1987 Reno, Nev., cover page plus p. 767—H0-15-3123.
IEEE Journal of Quantum Electronics, vol. 24, No. 2, Feb. 1988, IEEE (New York), US, W. H. Knox: "Femtosecond optical pulse amplification", pp. 388–397.
Electronics Letters, vol. 25, No. 1, Jan. 5, 1989, (Stevenage, Herts, GB), R. I. Laming et al.: "Efficient pump wavelengths of erbium-doped fibre-optical amplifier", pp. 112–114.
Inter. Sch. Rpt. Jul. 1990.

Primary Examiner—John D. Lee
Assistant Examiner—Robert E. Wise
Attorney, Agent, or Firm—Nixon & Vanderhye

[57] ABSTRACT

A laser amplifier having an improved pump efficiency for a given pump power comprises a pump source (46) longitudinally coupled at a plurality of coupling points (47, 48, 49) to an optical fibre (41). By thus coupling the pump power into the fibre (41), a fraction of the pump power is applied to the fibre (41) at each of the coupling points (47, 48, 49). A significant improvement in pump efficiency may be achieved in this way.

11 Claims, 3 Drawing Sheets

LASER AMPLIFIER

This is a continuation of application Ser. No. 07/768,222, filed Oct. 15, 1991, filed as PCT/GB90/00354, Mar. 8, 1990 now abandoned.

This invention relates to longitudinally pumped laser amplifiers of the type comprising either three or four level laser systems and particularly, but not exclusively, to optical fibre laser amplifiers.

It is known that a laser amplifier may be formed by optically pumping an optical fibre doped with appropriate ionic species at a particular wavelength. Such laser amplifiers exhibit high pump power densities and good thermal dissipation and thus enable the operation of lasing with low pump power thresholds. Indeed, continuous wave lasing in doped fibres has recently been achieved on 3-level laser transitions which had previously not been operated in bulk glasses at room temperature.

For telecommunication purposes, erbium doped silica based optical fibres are of particular interest as laser sources and amplifiers. An ionic transition exists at about 1.5 μm which coincides with the low-loss window of fused silica fibres. Furthermore, since erbium doped fibre has an absorption band at 800 nm, the possibility exists for a variety of active fibre devices pumped by compact, efficient gallium arsenide laser diodes. However, the energy levels of some laser systems such as the erbium doped fibre described above are such that there exists at certain wavelengths suitable for optical pumping a parasitic phenomenon known as excited state absorption (ESA). This is a process in which ions in the upper laser manifold of the system are excited by pump photons into higher energy states. These excited ions then relax non-radiatively back into the metastable manifold. This has the effect of reducing the proportion of pump photons which are usefully involved in producing a population inversion. The fraction of pump photons wasted is proportional to the relative populations of the upper and ground state manifolds. The greater the pump power, the greater the upper level population becomes, and hence the greater the effect of ESA. This results in the pumping process becoming more inefficient as the pump power is increased.

It is an object of the present invention to provide a fibre laser amplifier having improved pump efficiency for a given pump power.

Accordingly, the present invention provides a laser amplifier including: a single mode optical fibre; a single optical pump source for providing optical radiation at a pump wavelength; and plurality of fibre amplifier sections each containing a lasing medium which exhibits excited state absorption at the pump wavelength and pumpable by the optical pump source; characterized in that: the optical pump source is coupled to each of the sections so that each section is end-pumpable by a fraction of the optical pump signal whereby each fraction propagates, in use, longitudinally along the respective fibre amplifier section; and in that each section is pumped, in use, by a fraction of the pump energy which has not passed through any other section.

An optical fibre of the type suitable for use in the present invention typically has a diameter of approximately 10 μm.

For any end-pumped fibre amplifier there exists a maximum pump efficiency achievable for a given pump power. The inventors have determined that as a result of ESA increasing with increasing pump power, the gain reduction associated with a given pump power may be reduced by dividing the pump power into two or more fractions and longitudinally pumping two or more fibre sections each with a fraction of the pump power thus increasing the pump efficiency. In this way, the pump energy distribution along the fibre is kept low, and hence the relative effects of ESA are reduced as will be explained in more detail below.

The fibre amplifier sections may be adjacent portions of a single fibre, or they may each be a separate length of a fibre, optically coupled to each other.

Preferably, in a system having two fibre amplifier sections, the sections are at least partially coincidental, the direction in which a first fraction of the pump power is pumped in one section being opposite to that in which a second fraction is pumped in the other section. This leads to additional gain being achieved because remnant pump power from one fibre amplifier section may be combined with the pump power in the second fibre amplifier section.

Preferably the pump source is longitudinally coupled to the fibre by means of one or more dichroic fibre couplers. Such couplers are capable of coupling a pump signal whilst coupling the signal radiation into the same fibre.

In a laser amplifier comprising a three level laser system, there exists an optimum length of fibre which, for a given pump power, will enable the maximum pump efficiency to be achieved. This optimum length depends upon the launched pump power and the pump absorption. For a low pump power, the optimum fibre length will be shorter than that for a higher pump power.

Preferably, the length of each fibre amplifier section is substantially the optimum length for the pump power fraction at which it is being pumped.

The invention will now be described by way of example only with reference to the following diagrams in which.

Figure 1:
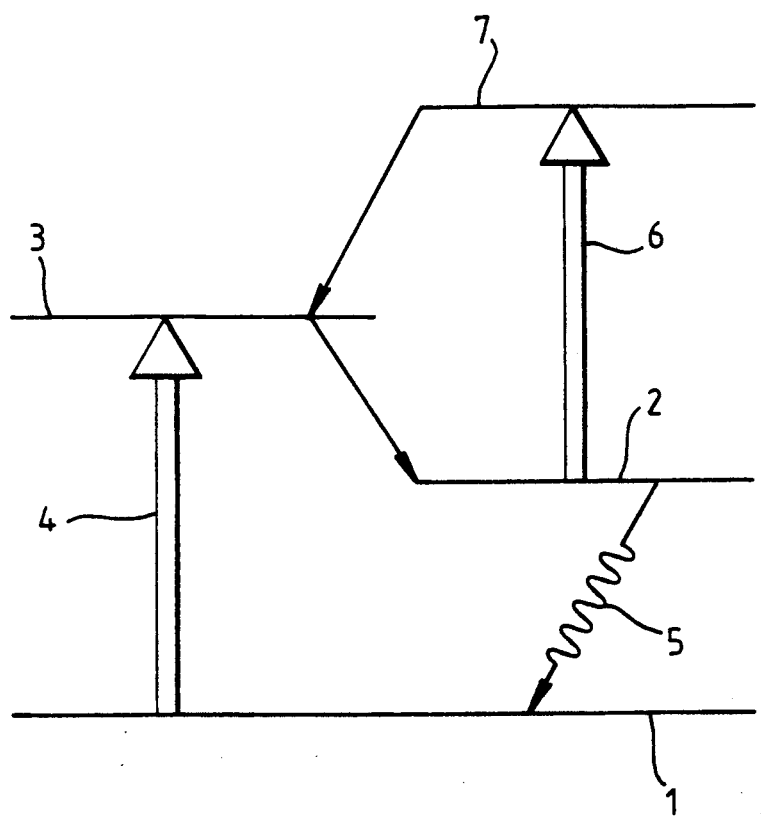
FIG. 1 is a schematic diagram of the energy level structure of Erbium ions ($Er^{3+}$) in a $SiO_2$ host.

Referring to FIG. 1, the energy level structure for the 1.5 μm lower transition of Erbium ions ($Er^{3+}$) is shown. $Er^{3+}$ ions in a 3-level laser system have an energy level structure comprising a ground state 1, an intermediate metastable manifold 2 and a high state 3. The system comprises a pump band 4 at a wavelength of about 800 nm and an emission/absorption band 5 at a wavelength of about 1540 nm. Thus, by optically pumping an erbium doped silica based fibre at 800 nm, erbium ions will be excited to the high state 3 and from there, they will decay to the metastable manifold 2. For low pump powers there will be more ions in the ground state 1 than in the metastable manifold 2. Once there are sufficient ions in the metastable manifold 2 for there to be a population inversion between manifold 2 and the ground state 1, there will be optical gain in the region of 1540 nm and thus the system can amplify an input signal. In order to produce a population inversion between the manifold 2 and the ground state 1, at any position along the fibre a certain minimum optical pump power is required. This power is known as the transparency power. If at any position down the fibre, the pump power is lower than the transparency power, the gain coefficient at that point will be negative. When the pump power at any point is equal to the transparency power, the gain coefficient at that point will be zero. Pump powers greater than the transparency power will produce positive gain coefficients. For a pump signal having a wavelength of about 800 nm the transparency power required to bleach the 1540 nm absorption band 5 is a few millwatts.

Unfortunately, the energy level structure contains a further absorption band, the excited state absorption (ESA) band 6. This absorption band 6 exists between the metastable manifold 2 and a higher level 7. The ESA band occurs at a wavelength of about 800 nm which is substantially the same as the pump absorption band 4. Thus, by pumping the fibre at 800 nm, ions are excited into the metastable manifold 2. These ions can then be excited to the higher level 7, from where they non-radiatively decay back to the metastable manifold 2. This has the effect of reducing the proportion of pump photons which are usefully involved in producing a population inversion. The fraction of pump photons wasted is proportional to the relative populations of the manifold 2 and the ground state 1. It has been determined by the inventors that by pumping at higher pump powers, the effects of ESA are increased.

Figure 2:
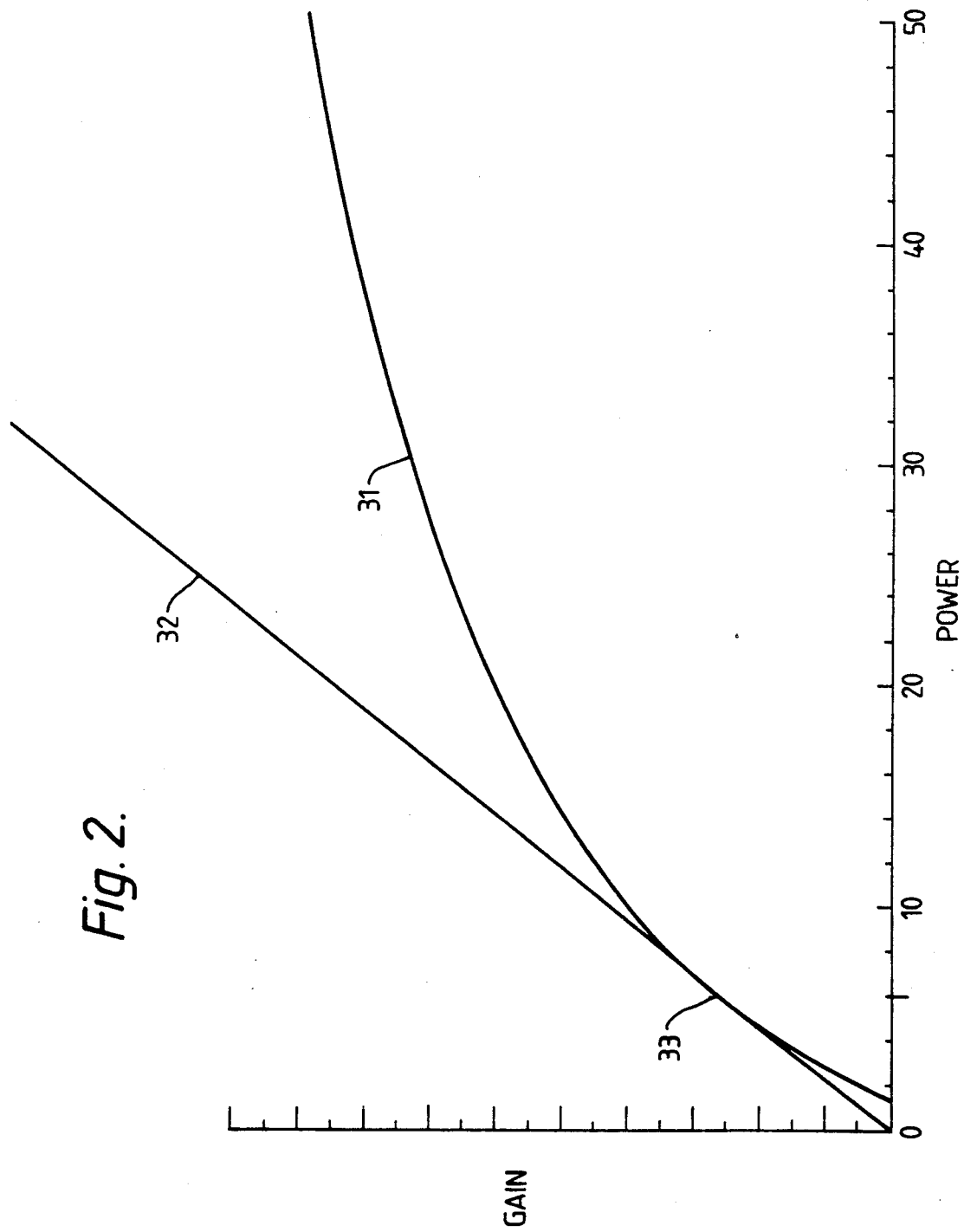
FIG. 2 is a graph showing the variation of optimum gain with pump power launched into a fibre.

Referring to FIG. 2, the variation of optimum gain with pump power launched into the fibre is shown: that is, for each particular pump power, the optimum gain is that gain achieved when the optimum length of fibre is used.

At high launched pump powers, the optimum gain increases very slowly with increasing pump power, because at such pump powers the pumping process is inefficient due to ESA.

By drawing a straight line 32 through the origin of the graph which is tangential to line 31, it can be seen that there is a pump power at which the ratio of optimum gain to launched pump power is a maximum. This pump power, in the example shown, is 6 mw.

The pump power at which this ratio reaches its maximum value will in general depend on fibre design as well as on the size of the pump absorption cross-section from the ground-state and the upper laser manifold. From FIG. 2 it can be seen that, by launching 24 mW of pump power into a single length of fibre of optimum length for the power launched a gain of 13 dB would be achieved. However, if instead of launching all the pump power into one length of fibre, the pump power were split into four fractions, each of 6 mW, and each of these four fractions were applied to a fibre of optimum length for 6 mW power fibre, the total gain available would be 22 dB. A significant improvement in pump efficiency of the exemplary amplifier has for the given available pump power thus been achieved. In general, for a given available input pump power, the gain can be maximised by splitting that pump power into a plurality of fractions, the pump power in each fraction being such that for the particular fibre, the ratio of optimum gain to launched pump power is a maximum, and launching each of the fractions into a separate length of fibre amplifier of optimum length.

Figure 3:
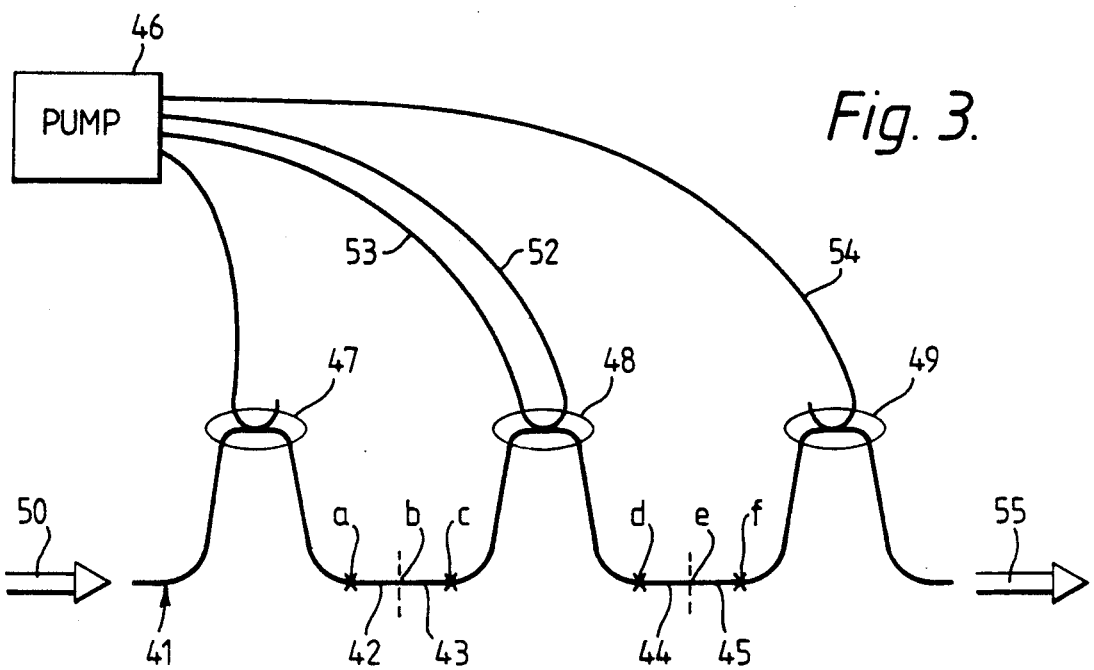
FIG. 3 is a schematic diagram of one embodiment of the invention.

Referring to FIG. 3, a fibre laser made in accordance with the invention is schematically illustrated. An optical fibre 41 has been notionally divided into four fibre amplifier sections 42, 43, 44, 45. Section 42 extends from point a to point b, 43 from b to c, 44 from d to e and 45 from e to f. The fibre amplifier sections 42, 43, 44, 45 comprise lengths of erbium doped optical fibre, whereas the remaining sections of the fibre 41 comprise undoped lengths of optical fibre. The fibre 41 is formed by splicing lengths of doped fibre to lengths of undoped fibre in an appropriate manner to form a single length of fibre. An optical pump 46, is longitudinally coupled to the fibre 41 via three couplers 47, 48, 49. Each of the three couplers is a dichroic fibre coupler. Each coupler may be formed by fusing together fibre 41 and a second fibre and by drawing each one by an appropriate amount in order that the coupler is capable of coupling pump radiation into the fibre 41 whilst leaving the input signal radiation 50 unaffected. Such couplers are well known and will not be described further.

At coupler 47 a pump fraction is longitudinally coupled into fibre section 42 via arm 51 in the same direction as the input signal radiation 50. At coupler 48, a second pump fraction is longitudinally coupled via arm 52 into fibre amplifier section 43 such that it travels in the opposite sense to the input signal 50. A third pump fraction is longitudinally coupled via arm 53 into fibre amplifier section 44 in the same sense as the input signal. A fourth pump fraction is longitudinally coupled via arm 54 of coupler 49 into fibre amplifier section 45. An amplified signal 55 is thus produced. The fibre amplifier sections 42, 43, 44, 45 are arranged to be close to the optimum length for the particular power at which they are being pumped, by referring to a graph similar to that of FIG. 3 for the particular parameters of the system. The fibre sections must be short enough to ensure that the transparency point is not exceeded in order that there is always positive gain.

When a pump signal has propagated along the length of a fibre amplifier section, there will be some remnant pump signal remaining. By arranging that pairs of pump fractions are pumped in opposite directions in adjacent fibre amplifier sections, as illustrated in this embodiment, the remnant pump from one fibre amplifier section combines with the pump fraction in the adjacent section to further maximise the gain.

Figure 4:
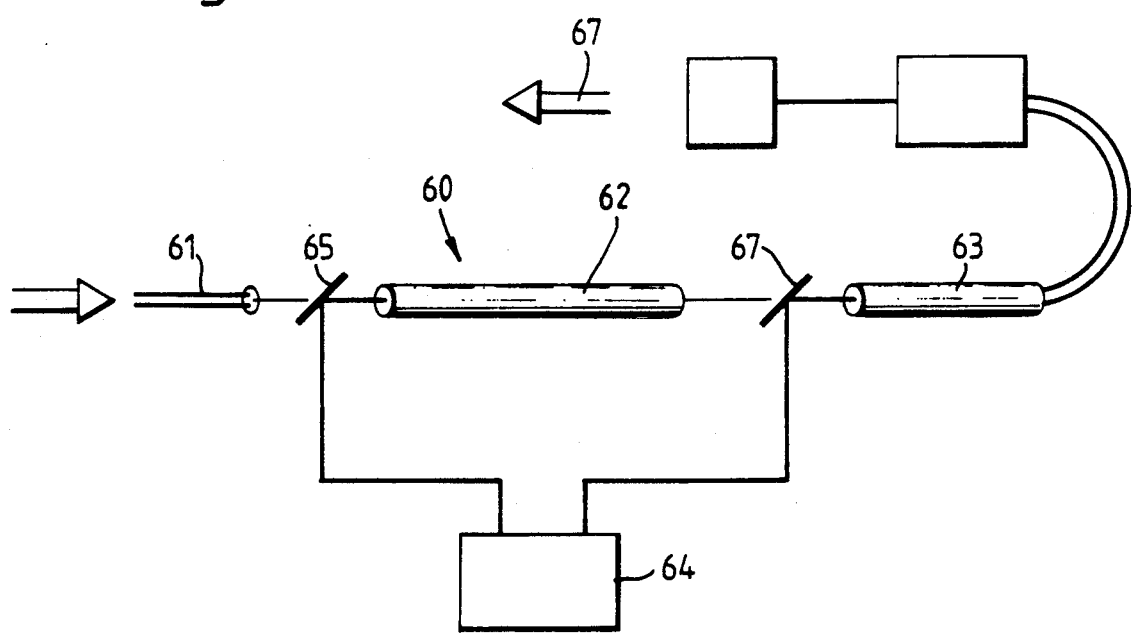
FIG. 4 is a schematic diagram of a second embodiment of the invention.

Referring to FIG. 4, a second embodiment of a laser amplifier constructed in accordance with the invention is illustrate schematically. The fibre amplifier shown generally by the numeral 60 comprises three fibre sections 61, 62, 63 which are separate from one another. An optical pump source 64 such as an 807 nm Styrl 9M dye laser produces an optical pump signal which is longitudinally coupled into fibre amplifier section 62 by means of a dielectric mirror 65. An input signal is also coupled into fibre section 62 via fibre section 61 and mirror 65. A second optical pump signal is produced by the pump source 64 and longitudinally coupled into fibre section 63. The input signal, after having propagated through fibre section 62 is also coupled into fibre section 63. An amplified signal 67 is thus produced.

In this specification, the term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibre.

It will be appreciated that other schemes for distributing the optical power from the pump means can be used other than those described in the specific embodiments referred to above, and that the fractions into which the pump power is split need not be equal fractions in order to obtain additional gain.

The optical pump distribution is applicable generally to three or four level systems which exhibit ESA at certain pump wavelengths and is not restricted to erbium doped silica based fibre laser amplifiers of the type described above.

We claim:

1. A laser amplifier including:
   a single mode optical fibre;
   a single optical pump source for providing optical radiation at a pump wavelength; and
   a plurality of fibre amplifier sections each containing a lasing medium which exibits excited state absorption at the pump wavelength and pumpable by the optical pump source;
   the optical pump source being coupled to each of the sections so that each section is end-pumpable by a fraction of the optical pump signal whereby each fraction propagates, in use, longitudinally along the respective fibre amplifier section;
   each section being pumped, in use, by a fraction of the pump energy which has not passed through any other section.

2. A laser amplifier according to claim 1 wherein the length of each fibre section is such that the transparency point for the pump power fraction by which it is pumpable is not exceeded.

3. A laser amplifier according to claim 1 wherein the fibre sections comprise adjacent portion of a single fibre.

4. laser amplifier according to claim 1 wherein the pump source comprises a laser diode array.

5. A laser amplifier according to claim 1 wherein the pump source is coupled to the fibre by means of one or more dichroic fibre couplers.

6. A laser amplifier according to claim 1 wherein the fibre amplifier sections each comprise an erbium doped silica based fibre.

7. A laser amplifier as in claim 6 in which the pump wavelength is about 800 nm.

8. A laser amplifier comprising:
   a plurality of series-coupled laser amplifier sections which each exhibit excited state absorption (ESA) losses at a pumped wavelength thereof so as to produce a maximum ratio of optimum amplifier gain to launched pump power at a predetermined pump power,
   each said amplifier section being pumped, in use, at approximately said predetermined pump power.

9. A laser amplifier comprising:
   a plurality of series-coupled laser amplifier sections which each exhibit excited state absorption (ESA) losses at a pumped wavelength thereof so as to produce a substantially diminished rate of increased gain versus increased pump power above a predetermined pump power level,
   each said amplifier section being pumped, in use, at a level no greater than said predetermined pump power level.

10. A laser amplifier comprising:
    a plurality of serially coupled, erbium doped, silica-based fibre laser amplifier sections, and
    means for pumping each said amplifier section at about 800 nm and at or below a pumping power level at which a further increase in pumping power causes excited state absorption (ESA) losses to substantially diminish the ratio of optimum amplifier gain to launched pump power.

11. A method of operating a plurality of laser amplifiers using a pump wavelength which produces increasing excited state absorption (ESA) losses at increased levels of pump power, said method comprising the steps of:
    arranging a plurality of said laser amplifiers optically in series; and
    pumping each of said plural laser amplifiers at a pump power level that does not exceed a predetermined level at which a further increase in pumping power would produce substantially increased (ESA) losses.

* * * * *